(12) United States Patent
Thomas et al.

(10) Patent No.: US 9,163,759 B2
(45) Date of Patent: Oct. 20, 2015

(54) FITTING CONNECTION INCLUDING COMPRESSION NUT WITH RETAINER

(71) Applicant: Masco Corporation of Indiana, Indianapolis, IN (US)

(72) Inventors: Kurt Judson Thomas, Indianapolis, IN (US); Alfred Charles Nelson, Westfield, IN (US)

(73) Assignee: Delta Faucet Company, Indianapolis, IN (US)

( * ) Notice: Subject to any disclaimer, the term of this patent is extended or adjusted under 35 U.S.C. 154(b) by 199 days.

(21) Appl. No.: 13/644,996

(22) Filed: Oct. 4, 2012

(65) Prior Publication Data

US 2014/0097615 A1    Apr. 10, 2014

(51) Int. Cl.
*F16L 33/00* (2006.01)
*F16L 19/065* (2006.01)

(52) U.S. Cl.
CPC .................... *F16L 19/065* (2013.01)

(58) Field of Classification Search
USPC ........ 285/346, 343, 342, 293.1, 295.2, 295.3, 285/354, 386, 389, 249
See application file for complete search history.

(56) References Cited

U.S. PATENT DOCUMENTS

| | | | |
|---|---|---|---|
| 771,682 A * | 10/1904 | Sussman | 285/331 |
| 871,607 A * | 11/1907 | Montogomery | 277/622 |
| 2,344,698 A | 3/1944 | Howe | |
| 3,018,119 A | 1/1962 | Champion | |
| 3,401,959 A | 9/1968 | Reiss et al. | |
| 3,831,983 A | 8/1974 | Stickler | |
| 3,857,591 A | 12/1974 | Voss | |
| 4,067,534 A | 1/1978 | Frey | |
| 4,452,473 A * | 6/1984 | Ruschke | 285/81 |
| 4,878,697 A | 11/1989 | Henry | |
| 4,915,534 A | 4/1990 | Richards | |
| 5,060,689 A | 10/1991 | Csaszar et al. | |
| 5,180,195 A | 1/1993 | Petroff et al. | |
| 5,213,375 A | 5/1993 | Wu | |
| 5,353,843 A | 10/1994 | Hoag | |
| 5,375,887 A | 12/1994 | Johnson | |
| 5,388,871 A * | 2/1995 | Saitoh | 285/247 |
| 5,507,531 A | 4/1996 | Aldridge | |
| 5,586,910 A | 12/1996 | Del Negro et al. | |
| 5,887,912 A | 3/1999 | Nakamura | |
| 5,895,695 A | 4/1999 | Rowley | |
| 6,012,743 A | 1/2000 | Godeau et al. | |
| 6,022,053 A * | 2/2000 | Hukuda | 285/331 |
| 6,082,780 A | 7/2000 | Rowley et al. | |
| 6,287,501 B1 | 9/2001 | Rowley | |
| 6,557,907 B2 | 5/2003 | Rowley | |
| 6,672,628 B2 | 1/2004 | Thomas et al. | |
| 6,722,708 B2 | 4/2004 | Morohoshi et al. | |
| 6,783,160 B2 | 8/2004 | Rowley | |
| 6,902,210 B1 | 6/2005 | Rowley | |
| 6,971,683 B2 * | 12/2005 | Mizukoshi | 285/247 |
| 7,093,864 B2 | 8/2006 | Wasmuth | |
| 7,108,288 B2 | 9/2006 | Bennett et al. | |
| 7,213,845 B2 | 5/2007 | Sato et al. | |
| 7,252,117 B1 | 8/2007 | Glenn | |
| 7,393,018 B2 | 7/2008 | Williams | |
| 7,407,196 B2 | 8/2008 | Bennett et al. | |
| 7,416,225 B2 | 8/2008 | Williams | |
| 7,677,602 B2 | 3/2010 | Bennett et al. | |
| 7,686,352 B2 | 3/2010 | Preston | |

(Continued)

*Primary Examiner* — Aaron Dunwoody
(74) *Attorney, Agent, or Firm* — Faegre Baker Daniels LLP

(57) ABSTRACT

A compression nut including a retaining tooth for use with a fluid coupling.

17 Claims, 7 Drawing Sheets

(56) References Cited

U.S. PATENT DOCUMENTS

| | | |
|---|---|---|
| 7,740,283 B2 | 6/2010 | Bennett et al. |
| 7,766,043 B2 | 8/2010 | Thomas et al. |
| 7,806,141 B2 | 10/2010 | Marty et al. |
| 7,815,226 B2 | 10/2010 | Williams |
| 8,146,955 B2 | 4/2012 | Thomas et al. |
| 2004/0090064 A1 | 5/2004 | Rowley |
| 2005/0194786 A1 | 9/2005 | McCord |
| 2007/0051418 A1 | 3/2007 | Rowles et al. |
| 2007/0271695 A1 | 11/2007 | Thomas et al. |
| 2008/0178950 A1 | 7/2008 | Marty et al. |
| 2008/0178957 A1 | 7/2008 | Thomas et al. |
| 2008/0217918 A1 | 9/2008 | Preston |
| 2009/0078322 A1* | 3/2009 | Thomas et al. ............ 137/15.09 |
| 2009/0079187 A1 | 3/2009 | Malone |

* cited by examiner

FITTING CONNECTION INCLUDING COMPRESSION NUT WITH RETAINER

BACKGROUND AND SUMMARY

The present invention relates generally to water connections and, more particularly, to water connections including a retainer having a retention member to engage a retaining ring on a fluid conduit.

Various water line connections or fluid couplings are known. Referring to FIG. 1, a conventional water line connection or fluid coupling 10 is shown. Connection 10 includes a supply line 12 for a water device, such as a faucet. An end 14 of supply line 12 is received in a receptacle 16 of a compression fitting 18. Receptacle 16 either communicates water to supply line 12 or receives water from supply line 12. A diameter of an inner surface 20 of receptacle 16 is generally equal to a diameter of external surface 22 of supply line 12. An exemplary diameter of surface 22 is ⅜ of an inch. Supply line 12 is received in receptacle 16 such that end 14 abuts surface 24 of receptacle 16. A ferrule ring 30 is then captured between compression fitting 18 and a hollow nut retainer 32 forming both a compression gasket and a retention feature for supply line 12. Ferrule ring 30 may be made of plastic or metal. A compression gasket may be used in place of ferrule ring 30. Surface 22 of supply line 12 acts as a sealing surface for ferrule ring 30. A hollow nut retainer 32 includes internal threads 34 which mate with external threads 26 of compression fitting 18, and a tapered inner surface 37 which engages the ferrule ring 30, to thereby sealingly couple retainer 32 to fitting 18.

Referring to FIG. 2, another water line connection or fluid coupling 50 is shown. A supply line 52 includes an overmold fitting 54 coupled thereto. The supply line 52 may be made from a PEX material. A diameter of outer surface 56 of overmold fitting 54 is equal to the diameter of inner surface 20 of fitting 18. Since outer surface 56 is defined by overmold fitting 54, a diameter of outer surface 58 of supply line 52 is less than the diameter of inner surface 20 of fitting 18. The diameter of surface 56 and surface 20 is ⅜ of an inch and the diameter of surface 58 is 5/16 of an inch. In FIG. 1, an installer could cut supply line 12 to length and then make the connection. In FIG. 2, an installer could not cut supply line 52 to length and then make a connection with a traditional sized ferrule ring 30 (since overmold fitting 54 has been cut off) because the diameter of surface 58 is not equal to the diameter of surface 20 of fitting 18.

A gasket 60 is captured between overmold fitting 54 and fitting 18. As in FIG. 1, a hollow nut retainer 32 is coupled to fitting 18 to connect supply line 52 to receptacle 16 of fitting 18. More particularly, internal threads 34 of retainer 32 mate with external threads 26 of compression fitting 18, and tapered inner surface 37 of retainer 32 engages the overmold fitting 54, to thereby sealingly couple retainer 32 to fitting 18.

In many prior art compression connections, such as water line connections 10 and 50 detailed above, the tapered inner surface 37 on the inside of the retainer 32 may force the retaining ring 30, 54 to collapse the flexible plastic tube 12, 52, respectively. Such a collapse may reduce the inner diameter of the tube 12, 52, reducing flow therethrough and, in extreme conditions, allow the retaining ring 30, 54 to pass through (i.e., extrude) through the retainer 32 causing failure by releasing the fluid coupling between the tube 12, 52 and the fitting 18.

According to an illustrative embodiment of the present disclosure, a supply line for coupling to a fitting having a receptacle includes a fluid conduit having a first end, a second end, and a fluid passageway extending therethrough. A retaining ring is coupled to the fluid conduit proximate the first end. The retaining ring includes an outer perimeter greater than the outer perimeter of the conduit. A retainer is axially movable along the fluid conduit between a first position where the retainer is in axially spaced relation to the fitting, and to a second position where the retainer engages the fitting and the overmolded retaining ring to define a fluid coupling between the fluid conduit and the fitting. The retainer includes an outer wall extending between opposing first and second ends, the first end of the outer wall facing in the same direction as the first end of the fluid conduit, and the second end of the outer wall facing in the same direction as the second end of the fluid conduit. The retainer further includes a collar supported at the second end of the outer wall and extending radially inwardly to define an opening to slidably receive the fluid conduit. An annular protrusion is supported by the collar, is located radially inwardly from the outer wall, and extends axially from the second end of the retainer towards the first end of the retainer. The annular protrusion includes a deforming face facing radially outwardly and facing axially in the direction from the second end of the retainer toward the first end of the retainer. The deforming face extends from a first end and a second end. The leading edge is of sufficient hardness to deform the retaining ring radially outwardly as the retainer reaches the second position, the leading edge being positioned at a first end of the deforming face and facing toward the first end of the retainer. A relief portion is configured to receive deformed material from the overmolded retaining ring as the retainer reaches a second position, the relief portion positioned at a second end of the deforming face and facing toward the first end of the retainer.

According to another illustrative embodiment of the present disclosure, a supply line for coupling to a threaded fitting having a receptacle includes a flexible polymeric fluid conduit having a first end, a second end, and a fluid passageway extending therethrough. A polymeric retaining ring is coupled to the fluid conduit proximate the first end, the retaining ring having an outer perimeter greater than an outer perimeter of the conduit. A metal retainer with internal threads is axially movable along the fluid conduit between a first position where the retainer is in axially spaced relation to the fitting, and a second position where the retainer threadably engages the fitting and engages the retaining ring to define a fluid coupling between the fluid conduit and the fitting. The retainer includes an outer wall extending between opposing first and second ends, the first end of the outer wall facing in the same direction as the first end of the fluid conduit, and the second end of the outer wall facing in the same direction as the second end of the fluid conduit. A collar is supported at the second end of the retainer and extends radially inwardly to define an opening to slidably receive the fluid conduit. A retention tooth is supported by the collar, is located radially along the collar and extends axially from the second end of the retainer toward the first end of the retainer. The retention tooth includes a deforming face facing radially outwardly and facing axially from the second end of the retainer toward the first end of the retainer. The deforming face extends from a leading edge to a relief portion. The leading edge is of sufficient hardness to deform the retaining ring radially outwardly as the retainer reaches the second position. The relief portion is configured to receive deformed material from the retaining ring as the retainer reaches the second position.

In another illustrative embodiment of the present disclosure, a method for connecting a supply line to a fitting having a receptacle includes the steps of providing a retainer having an annular protrusion over a retaining ring and a first end of the fluid conduit. The method further includes the step of aligning the first end of the fluid conduit proximate to the receptacle, with the retainer proximate the fitting. The method also includes the steps of coupling the retainer onto the fitting to establish a sealed connection between the fluid conduit and the receptacle through which a fluid may flow, and forming an annular groove in the retaining ring with the annular protrusion. A leading edge and a deforming face of the annular protrusion deforms a portion of the retaining ring radially outwardly, and the deformed portion of the retaining ring comes to a rest in a relief portion of the retainer.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

Figure 3:
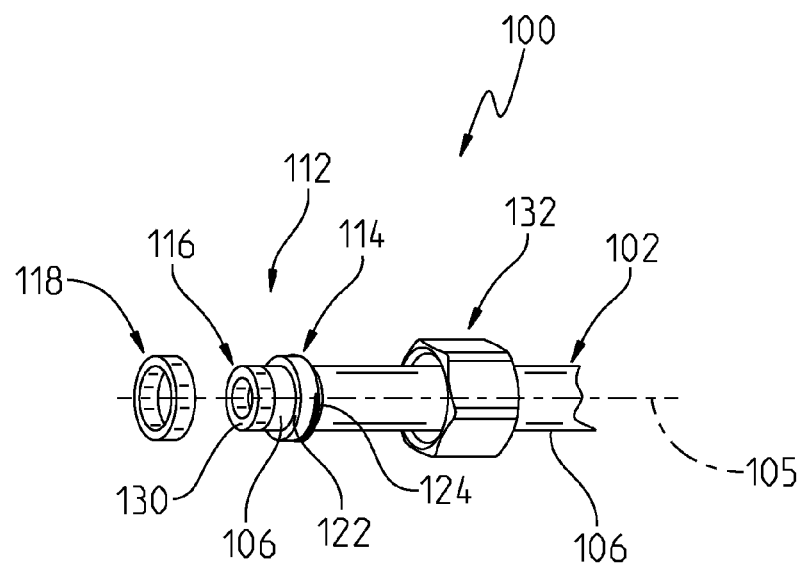
FIG. 3 is an exploded perspective view of a supply line including a connector having an overmold fitting including a retaining ring and an end ring coupled to the supply line, a seal, and a retainer.

Referring now to FIG. 3, a connector 100 for a supply line, illustratively a fluid conduit or tubular member 102, is shown. Supply line 102 includes a fluid passageway 104 (see FIG. 4) extending therethrough along a longitudinal axis 105, and has an outer surface 106 having a diameter generally equal to the diameter of inner surface 20 of receptacle 16 of fitting 18. As shown in FIG. 3, a portion of surface 106 is exposed proximate a first end 110 of supply line 102.

In one embodiment, supply line 102 is generally flexible and made from a non-metallic material. As such, the supply line 102 is electrically non-conductive. In one embodiment, supply line 102 is formed of a polymer. While in one illustrative embodiment, the supply line 102 is formed of a cross-linked polyethylene (PEX), it should be appreciated that other polymers may be substituted therefore. For example, the supply line 102 may be formed of any polyethylene (PE) (such as raised temperature resistant polyethylene (PE-RT)), of polypropylene (PP) (such as polypropylene random (PPR)), or of polybutylene (PB). It is further envisioned that the supply line 102 may be formed of cross-linked polyvinyl chloride (PVCX) using silane free radical initiators, of cross-linked polyurethane, or of cross-linked propylene (XLPP) using peroxide or silane free radical initiators.

Connector 100 includes an overmolded fitting 112. In the illustrated embodiment, the overmolded fitting 112 includes a first overmolded portion 114 and a second, spaced apart, overmolded portion 116. In alternative embodiments, overmold fitting 112 includes a single portion or more than two separate portions. Connector 100 further includes a sealing member 118 and a retainer 132. Exemplary seals 118 include gaskets, o-rings, and other suitable seals. Exemplary retainer 132 includes a hollow nut retainer as further detailed herein.

Additional information regarding overmolded components are provided in U.S. Pat. Nos. 5,895,695; 6,082,780; 6,287,501; 6,557,907; 6,902,210; U.S. patent application Ser. No. 11/700,634, filed Jan. 31, 2007, now U.S. Pat. No. 7,766,043, and U.S. patent application Ser. No. 11/700,598, filed Jan. 31, 2007, now U.S. Pat. No. 7,806,141, the disclosures of which are expressly incorporated by reference herein. Further, connector 100 may be used with the components disclosed in U.S. patent application Ser. No. 11/700,634, filed Jan. 31, 2007, now U.S. Pat. No. 7,766,043, and U.S. patent application Ser. No. 11/700,598, filed Jan. 31, 2007, now U.S. Pat. No. 7,806,141, the disclosures of which are expressly incorporated by reference herein.

First overmold portion 114 includes an axial surface 122, extending transversely to surface 106 of supply line 102 and which provides a stop for sealing member 118. First overmold portion 114 further includes an angled surface 124 which generally mates with an angled or tapered surface 137 of retainer 132. First overmold portion 114 is captured between retainer 132 and fitting 18 when threads 34 of retainer 132 engage threads 26 of fitting 18 to retain supply line 102 relative to fitting 18. As such, first overmold portion 114 functions as a retaining ring of connector 100.

Second overmold portion 116 is coupled to an axial surface 128 of supply line 102 and has an outer diameter generally equal to the diameter of surface 106 of supply line 102. In one embodiment, an end surface 130 of second overmold portion 116 contacts surface 24 of fitting 18 when supply line 102 is coupled to fitting 18. In one embodiment, an end surface 130 of second overmold portion 116 is spaced apart from surface 24 of fitting 18 when supply line 102 is coupled to fitting 18. Second overmold portion 116 is an end ring of connector 100.

In one embodiment overmold fitting 112 is made of a glass filled polyethylene. Overmold fitting 112 may be made of other materials including PEX, polyethylene, polypropylene, and nylon filled with glass fiber, glass beads, carbon fiber, aramid fibers, minerals (such as talc) or metallic fibers (such as stainless steel).

Figure 4:
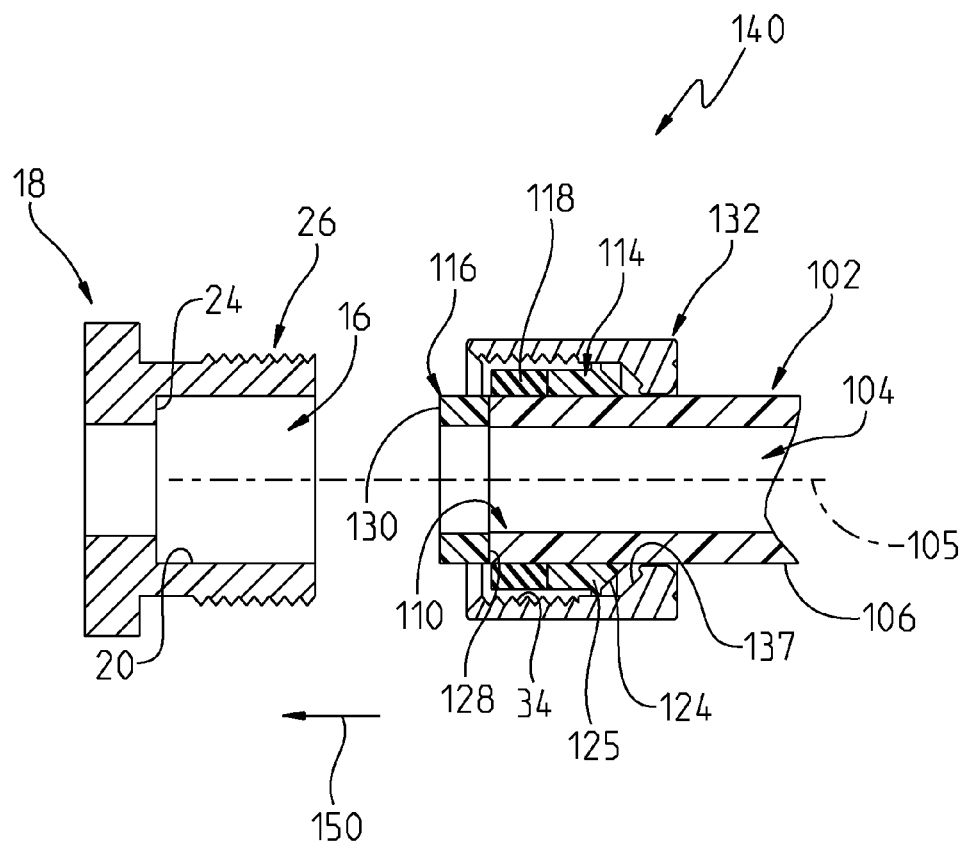
FIG. 4 is a cross-sectional view of the connector of FIG. 3 and the supply stop fitting.

With reference to FIG. 4, connector 100 assembles supply line 102 to fitting 18 to define a water line connection or fluid coupling 140. In one embodiment, fitting 18 provides water to supply line 102. In one embodiment, supply line 102 provides water to fitting 18. Regardless, to assemble supply line 102 to fitting 18, second overmold portion 116 of overmold fitting 112 is positioned in receptacle 16 of fitting 18 and advanced until end surface 130 of second overmold portion 116 contacts surface 24 of fitting 18 or until seal 118 or first overmold portion 114 provides adequate resistance to further advancement due to its contacting sealing surface 39 of fitting 18.

In one embodiment, seal 118 is present and supply line 102 may be assembled to fitting 18 by finger tightening retainer 132. In one embodiment, seal 118 is omitted and supply line 102 may be assembled to fitting 18 by tightening retainer 132 such that first overmold portion 114 contacts and seals against sealing surface 39 of fitting 18. In both cases end surface 130 of overmold portion 116 should not contact surface 24 of fitting 18 until an appropriate seal has been made between one of seal 118 or first overmold portion 114 and sealing surface 39 of fitting 18.

Returning to the assembly of supply line 102 to fitting 18 (i.e., water line connection 132), threads 34 of retainer 132 are engaged with threads 26 of fitting 18 and retainer 132 is advanced generally in axial direction 150. As retainer 132 is advanced in direction 150, surface 124 of first overmold portion 114 of overmolded fitting 112 contacts surface 137 of retainer 132 thereby also advancing supply line 102 in direction 150. The advancement in direction 150 further compresses seal 118 (or first overmold portion 114). In one embodiment, surface 130 provides a positive indication to stop advancement in direction 150 due to its contact with surface 24.

Figure 1:
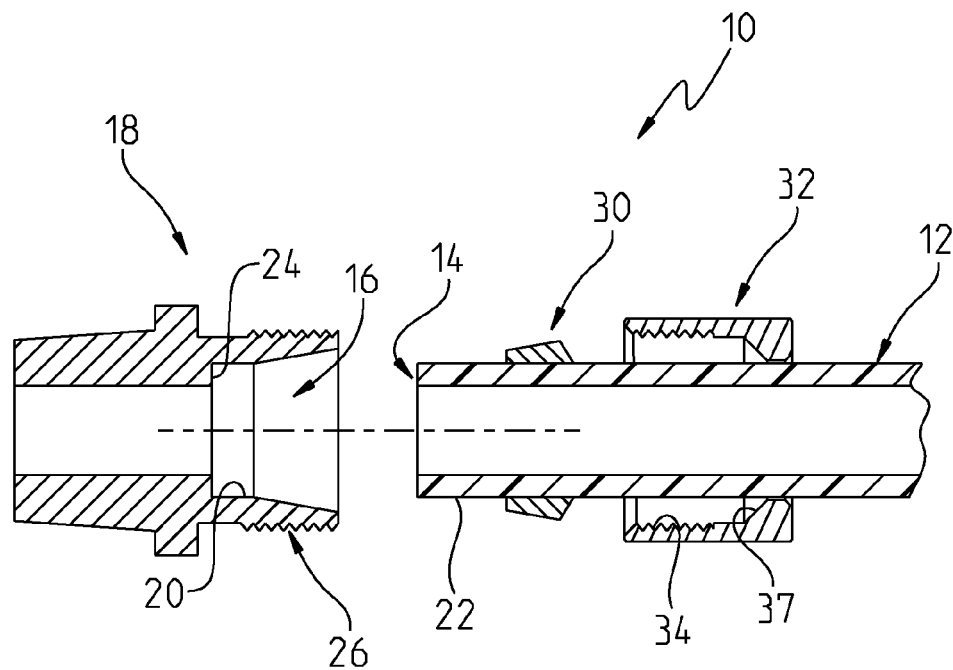
FIG. 1 is a cross-sectional view of a prior art water connection including a supply stop fitting, a supply tube, a ferrule ring, and a retainer.
Figure 2:
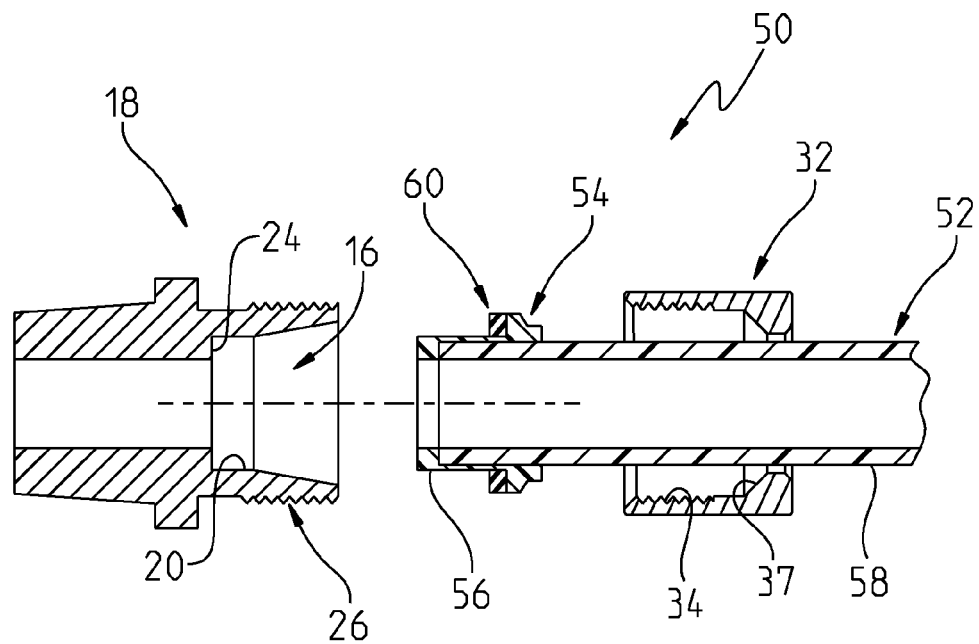
FIG. 2 is a cross-sectional view of a prior art water connection including a supply stop fitting, a supply tube, an overmold fitting, and a retainer.

Seal 118 seals against surface 39 of fitting 18 and against surface 106 of supply tube 102 to prevent the flow of water other than from one of fitting 18 and supply line 102 to the other of fitting 18 and supply line 102. By sealing directly against surface 106 of supply tube 102 a leak between the overmold and the supply tube is not an issue. Such is not the case in the prior art device shown in FIG. 2.

Further, by using surface 106 as the sealing surface for seal 118 then supply tube 102 may be cut to a different length and a traditional sized ferrule ring 30 or seal 118 may be used therewith. This allows an installer to use overmold fitting 112 when supply line 102 is generally the correct length and to cut off overmold fitting 112 and use traditional methods when supply line 102 is too long. An exemplary method of coupling a supply line to a compression fitting includes the steps of: providing a supply line having an overmolded fitting corresponding to a first end of the supply line, the supply line having an outer diameter generally equal to an inner diameter of the compression fitting; removing a length of the supply line including the overmolded fitting; placing a sealing member over an end of the remaining supply line; inserting the remaining supply line into the compression fitting; and tightening a retainer. The sealing member sealing the connection between the supply line and the compression fitting and acting as a retention feature for the supply line.

By having first overmold portion 114 bounded by surface 106 on both sides, the strength of the coupling between first overmold portion 114 and supply line 102 is believed to be increased. This makes it more difficult to separate supply tubing 102 from overmold fitting 112. Further, improved shutoff relative to the mold is believed to be achieved.

Figure 5:
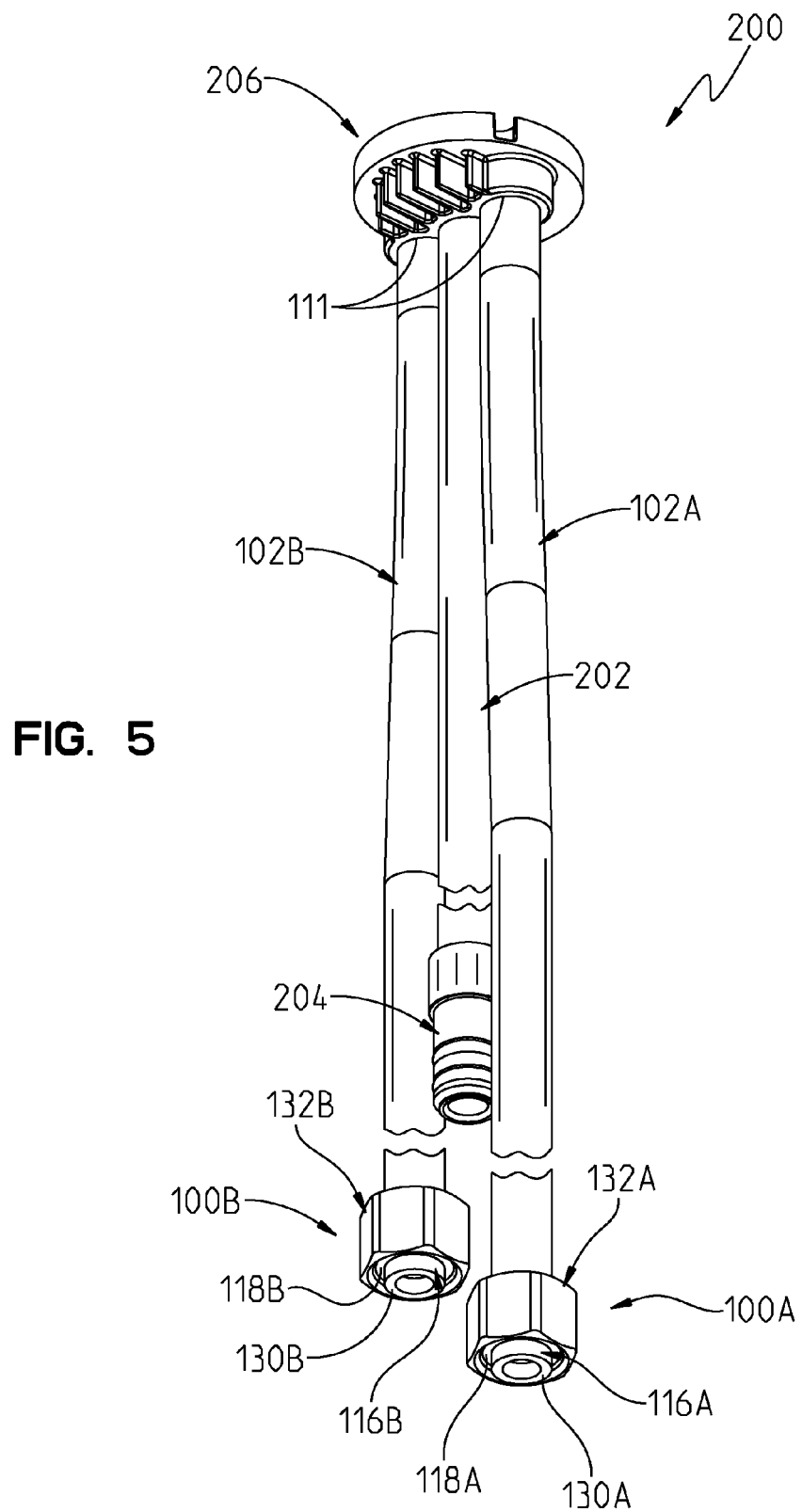
FIG. 5 is a perspective view of a supply assembly for a faucet including a hot water supply line having a connector of FIG. 3, a cold water supply line having a connector of FIG. 3, a mixed water outlet line, and an overmolded puck coupled to the hot water supply line, the cold water supply line, and the mixed water outlet line.

In one embodiment, overmolded fitting 112 includes a visual indicator which identifies the corresponding supply line 102 as a hot water supply line or a cold water supply line. In one embodiment, the visual indicator is a color of the overmolded fitting. One or both of overmold portion 114 and overmold portion 116 have a corresponding color to act as the visual indicator. As shown in FIG. 5, during installation first overmold portion 114 of overmold fitting 112 is generally obscured from view due to retainer 132 and seal 118. As such, in a preferred embodiment, overmold portion 116 has a corresponding color to act as the visual indicator. Generally both overmold portion 114 and overmold portion 116 are formed such that a single material is used during the molding operation.

Figure 7:
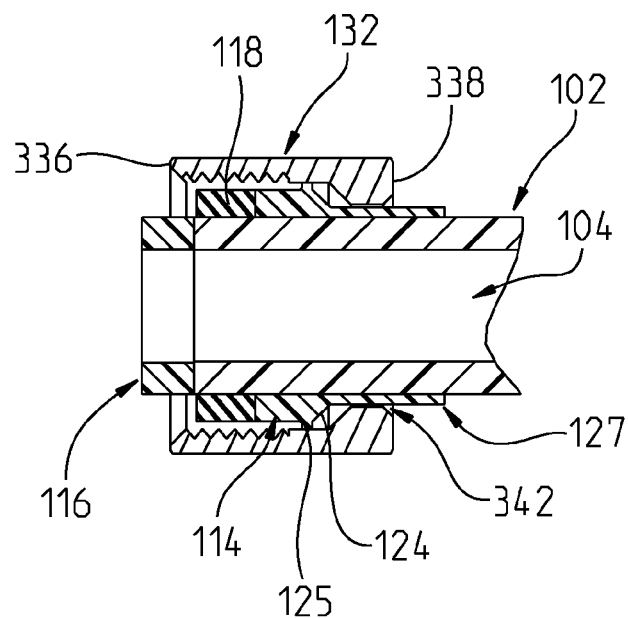
FIG. 7 is a cross sectional view of another exemplary connector.

In one embodiment, illustratively shown in FIG. 7, a portion 127 of overmold portion 114 extends outside of retainer 132, illustratively above retainer 32. Portion 127 may include a visual indictor to identify the corresponding supply line 102 as a hot water supply line or a cold water supply line. In one embodiment, the visual indicator of portion 127 is a color of portion 127. Second overmold portion 116 is shown in FIG. 7. In one embodiment, second overmold portion 116 may be omitted because portion 127 provides the visual indicator of the identity of supply line 102.

Referring to FIG. 5, a supply assembly 200 is shown. Supply assembly 200 includes a hot water supply line 102A, a cold water supply line 102B, a mixed water supply line 202 and a overmolded puck 206. Mixed water supply line 202 includes a fitting 204 and is coupled to a water delivery device, such as a faucet aerator. Puck 206 is coupled to hot water supply line 102A, cold water supply line 102B, and mixed water supply line 202. Puck 206 positions the hot water supply line 102A, the cold water supply line 102B, and the mixed water supply line 202 to be in fluid communication with a hot water inlet, a cold water inlet, and a mixed water outlet, respectively, of a valve assembly (not shown). Cold water inlet and hot water inlet provide cold water and hot water, respectively, to the valve assembly from which mixed water is provided to the mixed water outlet. Additional details regarding puck 206, the corresponding valve assemblies used with puck 206, and exemplary water delivery devices are provided in U.S. U.S. Pat. Nos. 7,766,043 and 8,146,955, the disclosures of which are expressly incorporated by reference herein.

Hot water supply line 102A and cold water supply line 102B include a respective connector 100A and 100B. Further, the respective second overmold portion 116A and 116B of supply lines 102A and 102B are color coded to indicate the identity of the respective supply line 102A and 102B. In one embodiment, the overmold portion 116A of hot water supply line 102A is red and the overmold portion 116B of cold water supply line 102B is blue.

In one embodiment, one or more of supply lines 102A, 102B and mixed water supply line 202 are flexible lines. In one embodiment, one or more of supply lines 102A, 102B and mixed water supply line 202 are flexible, corrugated lines. Exemplary corrugated lines include corrugated PEX lines. In one embodiment, corrugated PEX lines with overbraiding is used for one or more of supply lines 102A, 102B and mixed water supply line 202. Additional details regarding corrugated PEX lines with overbraiding are disclosed in U.S. Patent Application Publication No. 2008/0178957, the disclosure of which is expressly incorporated by reference herein.

Figure 6:
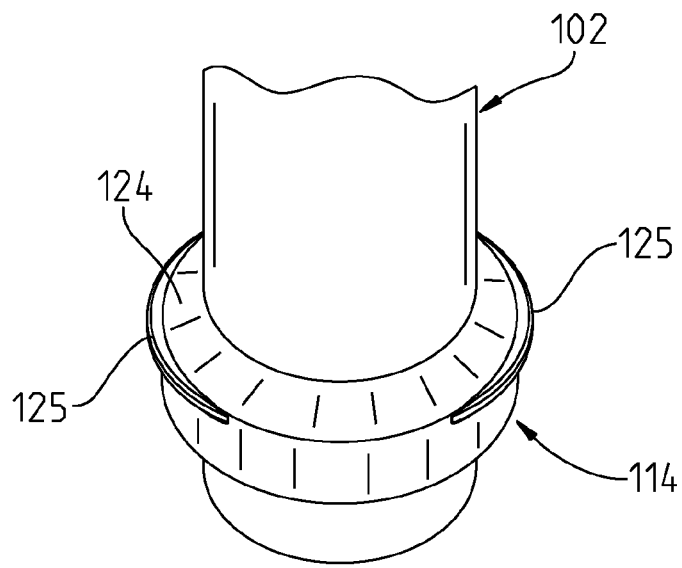
FIG. 6 is a perspective view of the supply line and retaining ring of FIG. 3.

Referring to FIG. 6, overmold portion 114 includes a protrusion 125 which engages retainer 132 to retain retainer 132 on fitting 112. In the illustrated embodiment, protrusion 125 is formed as two separate protrusions. Fewer or more separate protrusions may be used. Protrusion 125 engages with threads 34 of retainer 132 and retainer 132 is threaded onto protrusion 125.

Figure 8:
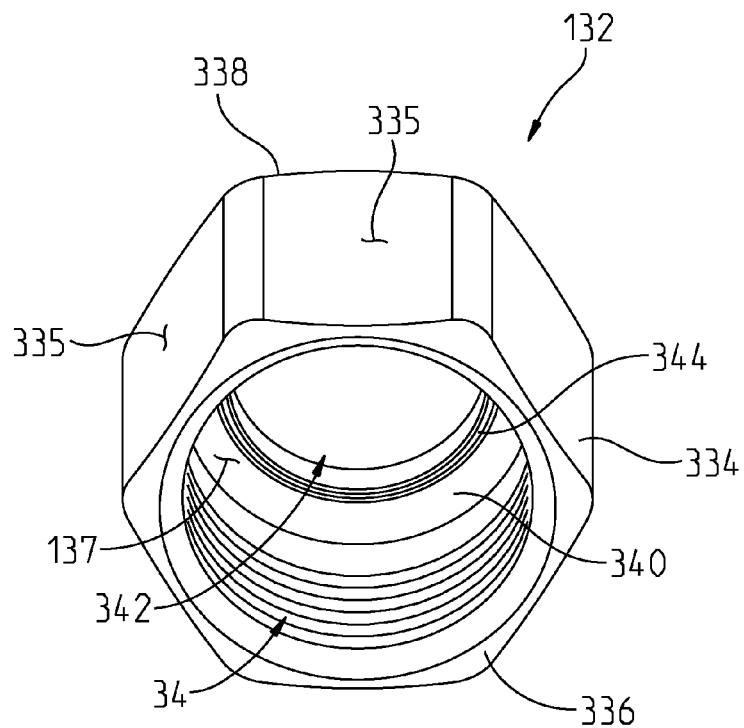
FIG. 8 is a perspective view of the retainer of FIG. 3.
Figure 9:
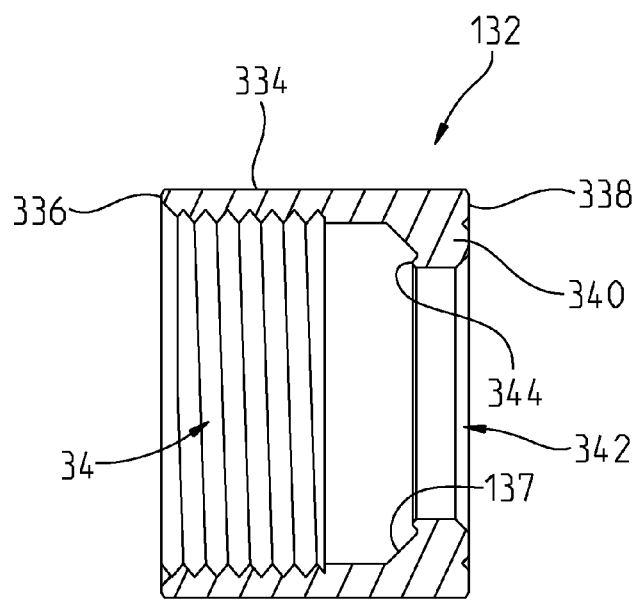
FIG. 9 is a cross-sectional view of the retainer of FIG. 8.
Figure 10:
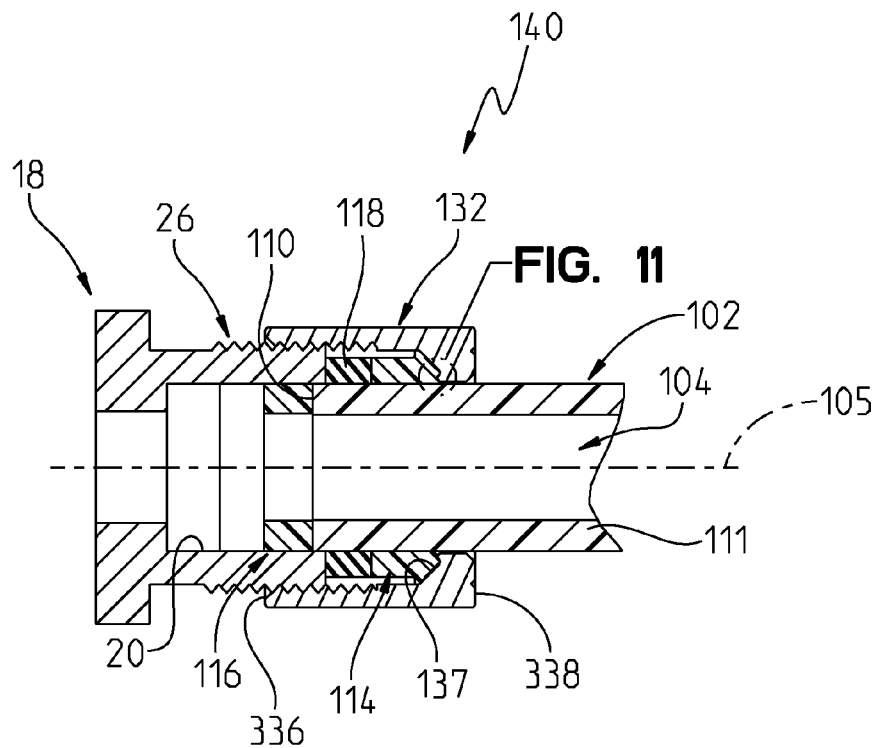
FIG. 10 is a cross-sectional view of an exemplary water connection.
Figure 12:
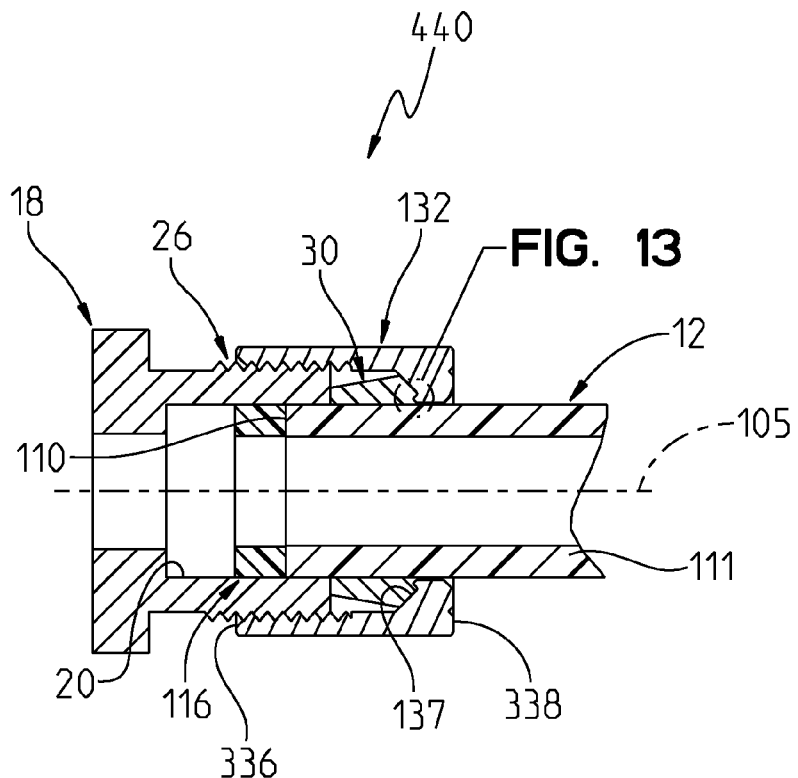
FIG. 12 is a cross-sectional view of an exemplary water connection.

Additional details of illustrative retainer 132 are shown in FIGS. 8 and 9 for use in the water line connections or fluid couplings 140 and 440 of FIGS. 10 and 12. The fluid couplings 140 and 440 include many common components as detailed above. As such, similar components are identified with like reference numbers.

Figure 11:
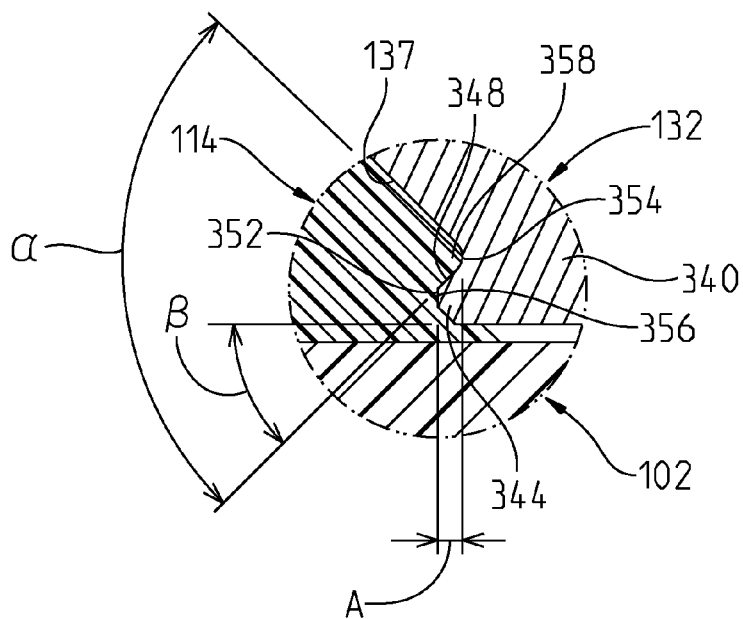
FIG. 11 is a detailed view of FIG. 10.
Figure 13:
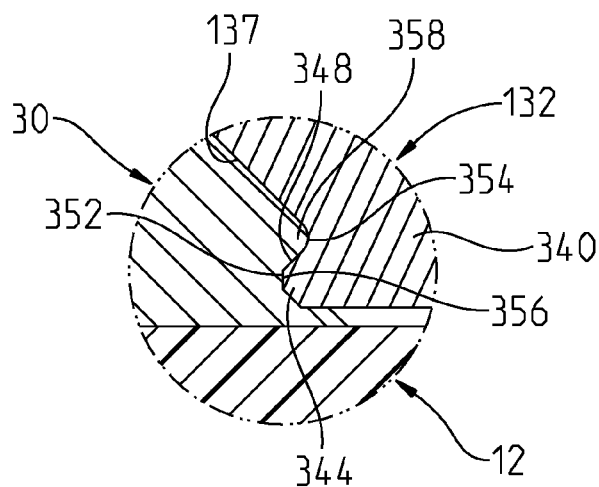
FIG. 13 is a detailed view of FIG. 12.

Fluid coupling 140 of FIGS. 10 and 11 illustratively includes overmolded portion 114 defining a retaining ring, while fluid coupling 440 of FIGS. 12 and 13 illustratively includes ferrule ring 30 defining a retaining ring. It should be appreciated that other types of retaining rings may be used with retainer 132 to define fluid couplings between fluid conduits 102, 12 and fittings 18.

As further detailed herein, the retainer 132 is axially movable along the fluid conduit 102 from a first position (i.e., uncoupled) axially spaced from the fitting 18 (FIG. 3), to a second position (i.e., coupled) in engagement with the fitting 18 (FIGS. 10 and 12) for enclosing the retaining ring 114, 30 and defining a fluid coupling 140, 440 between the fluid conduit 102, 12 and the fitting 18. More particularly, the retainer 132 may be axially moved along conduit 102, 12 between a position axially spaced from the retaining ring 114, 30 (FIG. 3), to a position where the retainer 132 radially overlaps the retaining ring 114, 30 but internal surface 137 is axially spaced from the retaining ring 114, 30 (FIG. 4), to a position where the threads 34 of the retainer 132 engage the threads 26 of the fitting 18, and the surface 137 of the retainer 132 engages the retaining ring 114, 30 (FIGS. 10 and 12).

With reference to FIGS. 8 and 9, the retainer 132 illustratively includes an outer wall 334 extending between opposing first and second ends 336 and 338. The outer surface of the outer wall 334 illustratively includes a plurality of flats 335 for engagement with a tool, such as a wrench, to assist in securing the retainer 132 on the fitting 18. Internal threads 34 are supported by an inner surface of the outer wall 334. The first end 336 of the outer wall 334 faces in the same direction as the first end 110 of the fluid conduit 102, while the second end 338 of the outer wall 334 faces in the same direction as the second end 111 of the fluid conduit 102. A collar 340 is supported by the second end 338 of the outer wall 334 and extends radially inwardly to define an opening 342 to slidably receive the fluid conduit 102.

A retention tooth, illustratively an annular protrusion 344, is supported by inner surface 137 of the collar 340. The annular protrusion 344 is located along the collar 340 radially inwardly from the outer wall 334, and extends axially in a direction from the second end 338 of the retainer 132 toward the first end 336 of the retainer 132. With reference to FIGS. 11 and 13, the annular protrusion 344 includes a deforming face 348 facing radially outwardly and facing axially from the second end 338 of the retainer 132 toward the first end 336 of the retainer 132. The deforming face 348 extends from a first end, proximate a leading edge 352, to a second end, proximate a relief portion 354.

The leading edge 352 of the annular protrusion 344 is of sufficient material hardness to deform the softer material of the retaining ring 114, 30 radially outwardly as the retainer 132 reaches the second or coupled position (i.e., moves axially toward the fitting 18). As noted herein, the retainer 132 is illustratively formed of a metal (e.g., brass or stainless steel), while the retaining ring 114, 30 is illustratively formed of a polymer (e.g., PEX).

The relief portion 354 is illustratively an annular groove configured to receive deformed material from the retaining ring 114, 30 as the retainer 132 moves axially toward the fitting 18 and reaches the second or coupled position (FIGS. 10 and 12). More particularly, as the retainer 132 moves axially toward the fitting 18 from the first position to the second position, the inner surface 137 and annular protrusion 344 engages the end of the retaining ring 114, 30. The deforming face 348 of the annular protrusion 344 deforms the material of the retaining ring 114, 30 radially outwardly into the relief portion 354. This interaction between the retainer 132 and the retaining ring 114, 30 helps prevent the retainer 132 from forcing past the retaining ring 114, 30. Illustratively, the annular groove of the relief portion 354 and the annular protrusion 344 are machined within the collar 340 of the retainer 132 through a trepan cutting operation.

With further reference to FIG. 11, the leading edge 352 of the annular protrusion 344 is axially spaced from the relief portion 354 by dimension A, illustratively 0.009 inches. The deforming face 348 is angled relative to the inner surface 137 by angle $\alpha$ (illustratively 90 degrees), while the deforming face 348 is angled relative to the longitudinal axis of the retainer 132 by angle $\beta$. (illustratively 45 degrees).

With further reference to FIGS. 4, 10 and 11, a method for connecting supply line 102, 12 to fitting 18 having a receptacle 16 includes the steps of aligning retainer 132 having annular protrusion 344 over retaining ring 114, 30 and first end 110 of fluid conduit 102, 12, whereby the retaining ring 114, 30 is proximate to the first end 110 of the fluid conduit 102, 12. The first end 110 of the fluid conduit 102, 12 is aligned with the receptacle 16 of the fitting 18. Next, the retainer 132 is coupled to the fitting 18 to establish a sealed connection 140, 440 between the fluid conduit 102, 12 and the receptacle 16 through which a fluid may flow. Illustratively, the coupling 140, 440 is by threading the internal threads 34 of the retainer 132 on the external threads 26 of the fitting 18.

An annular groove 356 is formed in the retaining ring 114, 30 by the leading edge 352 of the annular protrusion 344, whereby the deforming face 348 of the annular protrusion 344 deforms (i.e., forces) a portion of the retaining ring 114, 30 radially outwardly. The deformed portion 358 of the retaining ring 114 flows into relief portion 354 of the retainer 132.

In other words, when the retainer 132 is tightened on the fitting 18, the protrusion 344 engages and plastically deforms the retaining ring (e.g., either the overmolded flange 114 or the plastic compression ring 30). Such deformation of the retaining ring 114, 30 prevents the surfaces of the retainer 132 and the retaining ring 114, 30 from sliding past each other and forcing the tubing 102, 12 to collapse, as detailed above in certain prior art fluid coupling arrangements.

Although the invention has been described in detail with reference to certain preferred embodiments, variations and modifications exist within the spirit and scope of the invention as described and defined in the following claims.

The invention claimed is:

1. A supply line for coupling to a fitting having a receptacle, the supply line including:
   a fluid conduit having a first end, a second end, and a fluid passageway extending therethrough;
   a retaining ring coupled to the fluid conduit proximate the first end, the retaining ring having an outer perimeter greater than an outer perimeter of the conduit; and
   a retainer axially movable along the fluid conduit between a first position where the retainer is in axially spaced relation to a fitting, and to a second position where the retainer engages the fitting and the retaining ring to define a fluid coupling between the fluid conduit and the fitting, wherein the retainer includes:
      an outer wall extending between opposing first and second ends, the first end of the outer wall facing in the same direction as the first end of the fluid conduit, and the second end of the outer wall facing in the same direction as the second end of the fluid conduit, a collar supported at the second end of the outer wall and extending radially inwardly to define an opening to slidably receive the fluid conduit, and an annular protrusion supported by the collar, located radially inwardly from the outer wall, and extending axially in a direction from the second end of the retainer toward the first end of the retainer, whereby the annular protrusion includes:

a deforming face facing radially outwardly and facing axially in a direction from the second end of the retainer toward the first end of the retainer, the deforming face extending from a first end to a second end, a leading edge being of sufficient hardness to plastically deform the retaining ring radially outwardly as the retainer reaches the second position, the leading edge positioned at the first end of the deforming face and facing toward the first end of the retainer; and a relief portion being configured to receive deformed material from the retaining ring as the retainer reaches the second position, the relief portion positioned at the second end of the deforming face and facing toward the first end of the retainer, wherein the deformed material from the retaining ring flows into the relief portion of the retainer.

2. The supply line of claim 1, wherein the retainer has internal threads for coupling with external threads of the fitting.

3. The supply line of claim 2, wherein the retainer is made of a material harder than the retaining ring such that the retainer creates an annular groove in the retaining ring when the retainer is threaded to the fitting to define a fluid coupling between the fluid conduit and the fitting.

4. The supply line of claim 3, wherein the retainer is formed of a metal, and the retaining ring is formed of a polymer.

5. The supply line of claim 1, including an end ring coupled to the first end of the fluid conduit, the end ring permitting a fluid to pass into the fluid passageway of the fluid conduit wherein the retaining ring is spaced apart from the end ring.

6. The supply line of claim 5, further including:
a seal received proximate the first end of the fluid conduit, the seal being generally positioned between the end ring and the retaining ring and contacting an exterior surface of the fluid conduit.

7. The supply line of claim 1, wherein the fluid conduit is made from a flexible polymeric material.

8. The supply line of claim 1, wherein the annular protrusion is a machined trepan cut.

9. A supply line for coupling to a threaded fitting having a receptacle, the supply line including:
a flexible polymeric fluid conduit having a first end, a second end, and a fluid passageway extending therethrough;
a polymeric retaining ring coupled to the fluid conduit proximate the first end, the retaining ring having an outer perimeter greater than an outer perimeter of the conduit; and
a metal retainer having internal threads and being axially movable along the fluid conduit between a first position where the retainer is in axially spaced relation to a fitting, and a second position where the retainer threadably engages the fitting and engages the retaining ring to define a fluid coupling between the fluid conduit and the fitting, wherein the retainer includes:

an outer wall extending between opposing first and second ends, the first end of the outer wall facing in the same direction as the first end of the fluid conduit, and the second end of the outer wall facing in the same direction as the second end of the fluid conduit, a collar supported at the second end of the outer wall and extending radially inwardly to define an opening to slidably receive the fluid conduit, and a retention tooth supported by the collar, located radially along the collar and extending axially in a direction from the second end of the retainer toward the first end of the retainer, wherein the retention tooth includes:

a deforming face facing radially outwardly and facing axially from the second end of the retainer toward the first end of the retainer, the deforming face extending from a leading edge to a relief portion, the leading edge being of sufficient hardness to plastically deform the retaining ring radially outwardly as the retainer moves to the second position; and the relief portion being configured to receive deformed material from the retaining ring as the retainer moves to the second position, wherein the deformed material from the retaining ring flows into the relief portion of the retainer.

10. The supply line of claim 9, wherein the retention tooth is an annular protrusion.

11. The supply line of claim 10, wherein the annular protrusion is a machined trepan cut.

12. The supply line of claim 9, wherein the retainer is made of a material harder than the retaining ring such that the retainer creates an annular groove in the retaining ring when the retainer is threaded to the fitting to define a fluid coupling between the fluid conduit and the fitting.

13. A method for connecting a supply line to a fitting having a receptacle, the method comprising the steps of:
providing a retainer having an annular protrusion over a retaining ring and a first end of a fluid conduit;
aligning the first end of the fluid conduit with a receptacle of a fitting, with the retainer proximate to the fitting;
coupling the retainer onto the fitting to establish a sealed connection between the fluid conduit and the receptacle through which a fluid may flow; and
forming an annular groove in the retaining ring with the annular protrusion, whereby a leading edge and a deforming face of the annular protrusion plastically deforms a portion of the retaining ring radially outwardly, and the deformed portion of the retaining ring flows and comes to rest in a relief portion of the retainer.

14. The method of claim 13, further including the step of:
positioning a seal proximate the first end of the fluid conduit in contact with an exterior surface of the fluid conduit.

15. The method of claim 13, wherein the annular protrusion is a machined trepan cut.

16. The method of claim 13, wherein the retainer is made of a material harder than the retaining ring such that the retainer creates an annular groove in the retaining ring when the retainer is coupled to the fitting.

17. The method of claim 16, wherein the retainer is formed of a metal, and the retaining ring is formed of a polymer.

* * * * *